(United States Patent — Schussler et al., Patent Number: 4,999,777, Date of Patent: Mar. 12, 1991)

[54] ACTIVE SUSPENSION SYSTEM

[75] Inventors: Robert Schussler, Stuttgart; Bernd Acker, Esslingen, both of Fed. Rep. of Germany

[73] Assignee: Daimler-Benz AG, Fed. Rep. of Germany

[21] Appl. No.: 358,406

[22] Filed: May 30, 1989

[30] Foreign Application Priority Data

May 28, 1988 [DE] Fed. Rep. of Germany ....... 3818188

[51] Int. Cl.$^5$ .......................................... B60G 17/00
[52] U.S. Cl. .............................. 364/424.050; 280/707
[58] Field of Search ................... 364/424.05; 280/707, 280/6.11, 703, DIG. 1

[56] References Cited

U.S. PATENT DOCUMENTS

| | | | |
|---|---|---|---|
| 4,789,935 | 12/1988 | Buna et al. | 364/424.05 |
| 4,821,191 | 4/1989 | Ikemoto et al. | 364/424.05 |
| 4,853,860 | 8/1989 | Achenbach | 364/424.05 |
| 4,888,696 | 12/1989 | Akatsu et al. | 364/424.05 |

FOREIGN PATENT DOCUMENTS

| | | |
|---|---|---|
| 2441172 | 5/1975 | Fed. Rep. of Germany . |
| 3101194 | 12/1981 | Fed. Rep. of Germany . |
| 3212433 | 4/1983 | Fed. Rep. of Germany . |
| 3408292 | 8/1985 | Fed. Rep. of Germany . |

Primary Examiner—Parshotam S. Lall
Assistant Examiner—Tyrone Queen
Attorney, Agent, or Firm—Evenson, Wands, Edwards, Lenahan & McKeown

[57] ABSTRACT

Deflection detection pick-ups are arranged at the wheels or wheel suspensions of the vehicle, from the signals of which pick-ups a computer determines an averaged pitch angle. These averaged actual values are compared with predetermined or predeterminable set values. the correction of the supporting forces of the support assemblies effected thereupon by the computer is dependent on the extent to which the vehicle body has to execute pure lifting movements, pure rolling movements and/or pure pitching movements to approximate the actual values to the set values and in which proportions the forces necessary for the damping of rolling or pitching movements are to be applied by the support assemblies of the front or rear wheels. In this case, the forces serving for the compensation of rolling movements can be distributed over the front and rear wheels in such a way that a desired control tendency of the vehicle, in particular a tendency toward under-controlling, is obtained.

19 Claims, 3 Drawing Sheets

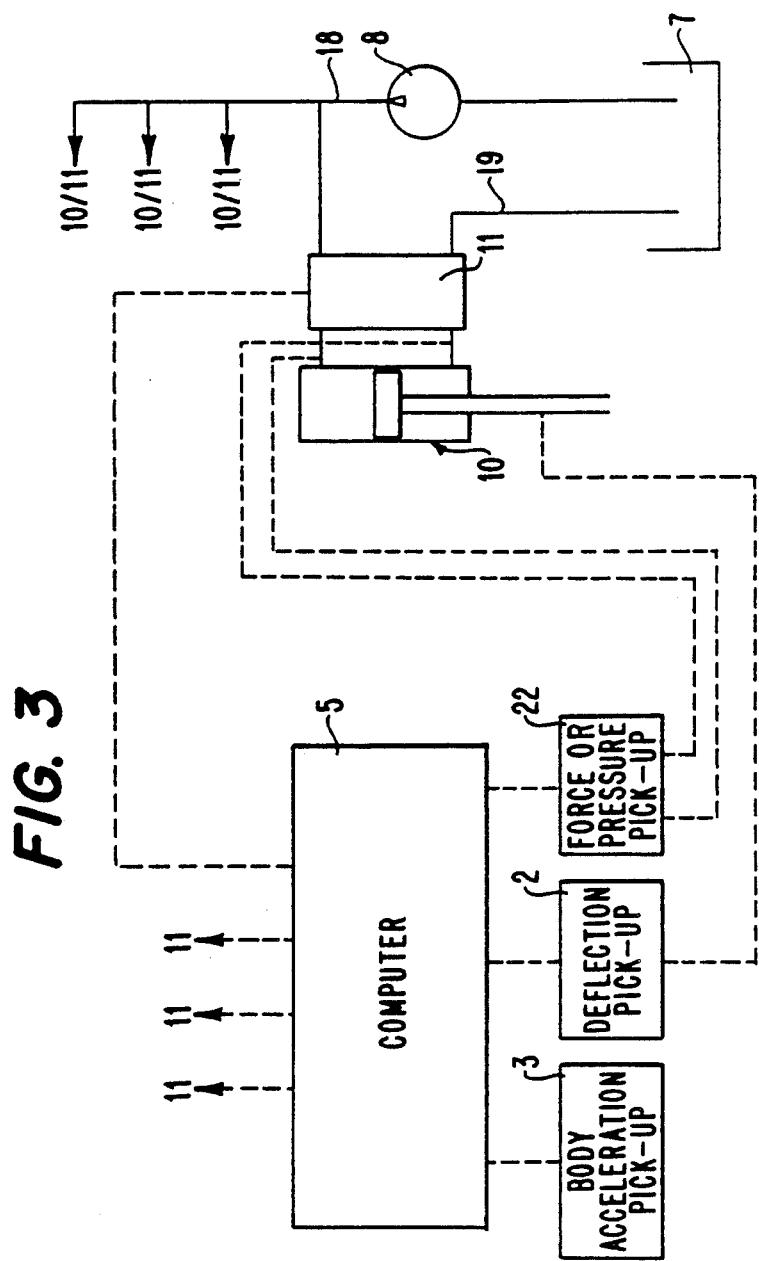

ACTIVE SUSPENSION SYSTEM

BACKGROUND AND SUMMARY OF THE INVENTION

The invention related to an active suspension system for motor vehicles or the like with actual-value pick-ups assigned to the wheels, which pick-ups generate in each case a signal representing the distance between vehicle body and wheel and feed it to a computer, as well as with spring and support assemblies which are assigned to the wheels, are controlled by the computer and whose supporting forces and/or resistances counteracting the lifting movements of the wheels are influenced by the computer in a predeterminable way.

In the case of conventional passive suspension systems, the value of the supporting forces depends in each case only on the lifting position of the wheels, i.e. the supporting force generated by a spring assembly increases with decreasing distance between the respective wheel and the body of the vehicle.

In spite of the high level of development of passive suspension systems, it remains unavoidable that compromises have to be made in setting. If, for example, the suspension is to be set soft with a view to high comfort, when traveling around a bend at high speed, the vehicle body will incline comparatively strongly towards the outside of the bend. Consequently, relatively great roll angles occur when traveling around a bend.

There is the possibility of reducing the roll angles by arrangement of stabilizers which, when there is compression of a wheel, try to urge the corresponding wheel on the other side of the vehicle likewise in the direction of compression, so that the spring assemblies on the inside of the bend are also used for supporting the wheels on the outside of the bend. However such stabilizers impair the suspension comfort if the vehicle travels over unevenesses in the ground only with the wheels of one side of the vehicle or if undulations in the ground running obliquely to the direction of travel are passed over.

Similar problems also occur with active suspension systems.

An active suspension system of the type specified at the beginning is known from German published Application (Offenlegungsschrift) 3,212,433 in which signals, which are dependent on the lifting positions of the wheels or of the assigned support assemblies and which change progressively with increasing deviation of the lifting position from an initial position or position of rest, are generated by means of sensors. These signals are then compared by means of a computer, the computer determining in each case which support assembly or wheel deviates the furthest from the initial position or position of rest. Then, the support assembly assigned to this wheel is actuated in the sense of a change in the respective supporting force.

German published Application (Offenlegungsschrift) 3,101,194 shows an active suspension system, in which first of all signals which reproduce the vertical accelerations of individual wheel groups are generated. From these signals, it is determined the extent to which the assigned support assemblies are to be deflected. Thereafter, the support assemblies are actuated in such a way that the deflection of the same measured in each case approximates to the deflection to be aimed for.

A suspension system in which essentially only the intensity of the damping of the suspension strokes is influenced actively is shown from German published Application (Offenlegungsschrift) 2,441,172. For this purpose, signals which represent the lifting position of the support assemblies assigned to the wheels and the vertical accelerations of the vehicle with the corresponding support assemblies are generated by means of corresponding sensors. Then the damping of the suspension system is varied in such a way that the accelerations of the vehicle body approximate a set value, which depends on the lifting position of the support assemblies.

An object of the invention is now to create an active suspension system which allows optimum setting in a particularly simple way.

This object is achieved according to the invention with a suspension system of the type specified above by the compute determining in each case from the pick-up signals an actual value of the averaged ground clearance, an actual value of the averaged roll angle and an actual value of the averaged pitch angle and actuating the spring and support assemblies as a function of the deviations of these actual values from predetermined or predeterminable set values.

The invention is based on the general idea that each movement of the vehicle body represents a combination of a pure lifting movement relative to a reference plane as well as a rotation about the vehicle longitudinal axis (rolling movement) and a rotation about the vehicle transverse axis (pitching movement). According to the invention, these movement components are now analyzed separately, as a result of which the possibility is offered of actuating the support or spring assemblies differently when there are changes in the lifting positions of the wheels, depending on whether the change in wheel position was effected by a rolling or pitching movement or a pure lifting movement of the body or by different combinations of these movement components. As a result, at the same time the possibility is offered of countercontrolling differently when there are different types of movement of the vehicle body by means of the spring or support assemblies. In particular, it is possible for example to absorb lifting movements of the vehicle body comparatively softly to achieve good comfort, while rolling and pitching movements are substantially counteracted with a view to safe vehicle handling. Thus, it can be readily achieved that, when traveling around a bend, the vehicle only inclines a little towards the outside of the bend in spite of a soft setting of the suspension with respect to lifting movements.

Since pitching and rolling movements of the vehicle can be prevented to the greatest extent, only small pitch and roll angles occur, i.e. the spring deflection of a wheel available in each case is scarcely impaired by inclined positions of the vehicle body with respect to the plane of the carriageway. Consequently, the possibility is offered of setting the suspension very comfortably with respect to lifting movements, because there is a large spring deflection available even in such driving conditions which would lead to larger pitch or roll angles in the case of conventional vehicles. Furthermore, the advantage is achieved that the wheel suspensions execute virtually only movements close to their optimum position and thus no self-steering of the vehicle, caused by the compression kinematics, can occur.

In addition, the forces necessary for the damping or suppression of rolling movements of the vehicle can be generated in predeterminable proportions by the support assemblies of the front and rear wheels in order to set the control tendency of the vehicle, for example to under-controlling or over-controlling or to neutral behavior.

Accordingly, a particularly safe and well controllable vehicle handling can be expected even in extreme situations.

The mean value of the distances of all wheels with respect to the vehicle body, or a value correlated with it, may be expediently used as averaged ground clearance. The difference between the mean value of the distances of the front wheels from the vehicle body and the mean value of the distances of the rear wheels from the vehicle body, or a value correlated with this difference, may serve as averaged pitch angle. The difference between the mean value of the distances of the right wheels from the vehicle body and the mean value of the distances of the left wheels from the vehicle body, or a value correlated with this difference, are suitable as averaged roll angle. If the mean values listed above are used, the position of the vehicle is determined relative to a reference plane which is parallel to two straight lines, one of which passes through the wheel contact areas of the right front wheel and of the left rear wheel and the other of which passes through the wheel contact areas of the left front wheel and of the right rear wheel.

According to a preferred embodiment of the invention, it is provided that the actuating signals for the spring and support assemblies, and the correction of the supporting forces and/or resistances with respect to lifting movements of the wheels, effected by the actuating signals, have in each case a value which corresponds essentially to the sum of those values which the computer would calculate for a correction of the ground clearance alone, a correction of the pitch angle alone, and a correction of the roll angle alone. In this way, different types of movement of the vehicle body can be influenced separately from one another in a simple way in terms of technical control.

In cases of extreme situations, the actuating force actually set at the spring and support assembly may deviate from the calculated value. Such a situation occurs above all whenever the supporting force calculated is close to or above the maximally generated supporting force. In such extreme cases, under certain circumstances the suspension may bottom. To avoid damage in such cases, compliant stops are arranged for wheel guide elements, as in the can of conventional suspension systems.

Furthermore, in the case of the suspension system according to the invention, it is advantageously envisaged to have the computer in each case determine from the pick-up signals the variation over time of the actual values of the averaged ground clearance, of the averaged pitch angle and of the averaged roll angle and to actuate the spring and support assemblies also as a function of the rate of change of the said actual values. Consequently, the supporting forces in each case set at the spring and support assemblies depend on the one hand on the type of movement of the vehicle body, i.e. on whether the vehicle body executes lifting movements, pitching movements and/or rolling movements. On the other hand, it is also taken into consideration at what rate these movements take place.

In principle, the wheels may execute lifting movements which do not lead to a change in the mean value of the ground clearance and/or of the mean value of the pitch angle and/or of the mean value of the roll angle. If, for example, the right front wheel and the left rear wheel compress simultaneously by the same spring deflections and the left front wheel and the right rear wheel rebound simultaneously by corresponding spring deflections, the said mean values remain unchanged if they are determined in the way specified above. In order to prevent the possibility of such wheel movements being induced over a prolonged time, it is sufficient if the suspension system according to the invention always operates in the sense of a weak fundamental damping of suspension strokes.

Instead, it is also possible that the computer determines the wheel movements not influencing the said mean values from the pick-up signals and only actuates the spring and support assemblies in the sense of a damping of these movements when such movements occur.

If appropriate, the vehicle may have body acceleration pick-ups and/or wheel acceleration pick-ups in order to be able to adapt the suspension system according to the invention even better to changing driving conditions. As a result, the possibility is created in particular of reacting at an early time to accelerations or decelerations of the vehicle or to commencing travel around a bend, before the vehicle body tries to execute major pitching or rolling movements. By means of the said acceleration pick-ups, there is namely the possibility of changing the set values for the supporting forces of the spring and support assemblies at a very early time, before the vehicle body can execute major movements upon braking, accelerating or turning of the steering. Those forces of inertia which try to generate the pitching and rolling movements can thus be compensated for immediately by corresponding counterforces, so that rolling and pitching movements can virtually not occur at all in the first place.

In this way, a "hard" spring characteristic can be attained particularly effectively for the pitching and rolling movements of the vehicle body, while preserving a "soft" compression movement, beneficial in terms of comfort, of the individual wheels.

Other objects, advantages and novel features of the present invention will become apparent from the following detailed description of the invention when considered in conjunction with the accompanying drawings.

BRIEF DESCRIPTION OF THE DRAWINGS

FIG. 3 is a schematic circuit diagram of the suspension system of FIGS. 1 and 2.

DETAILED DESCRIPTION OF THE DRAWINGS

Figure 1:
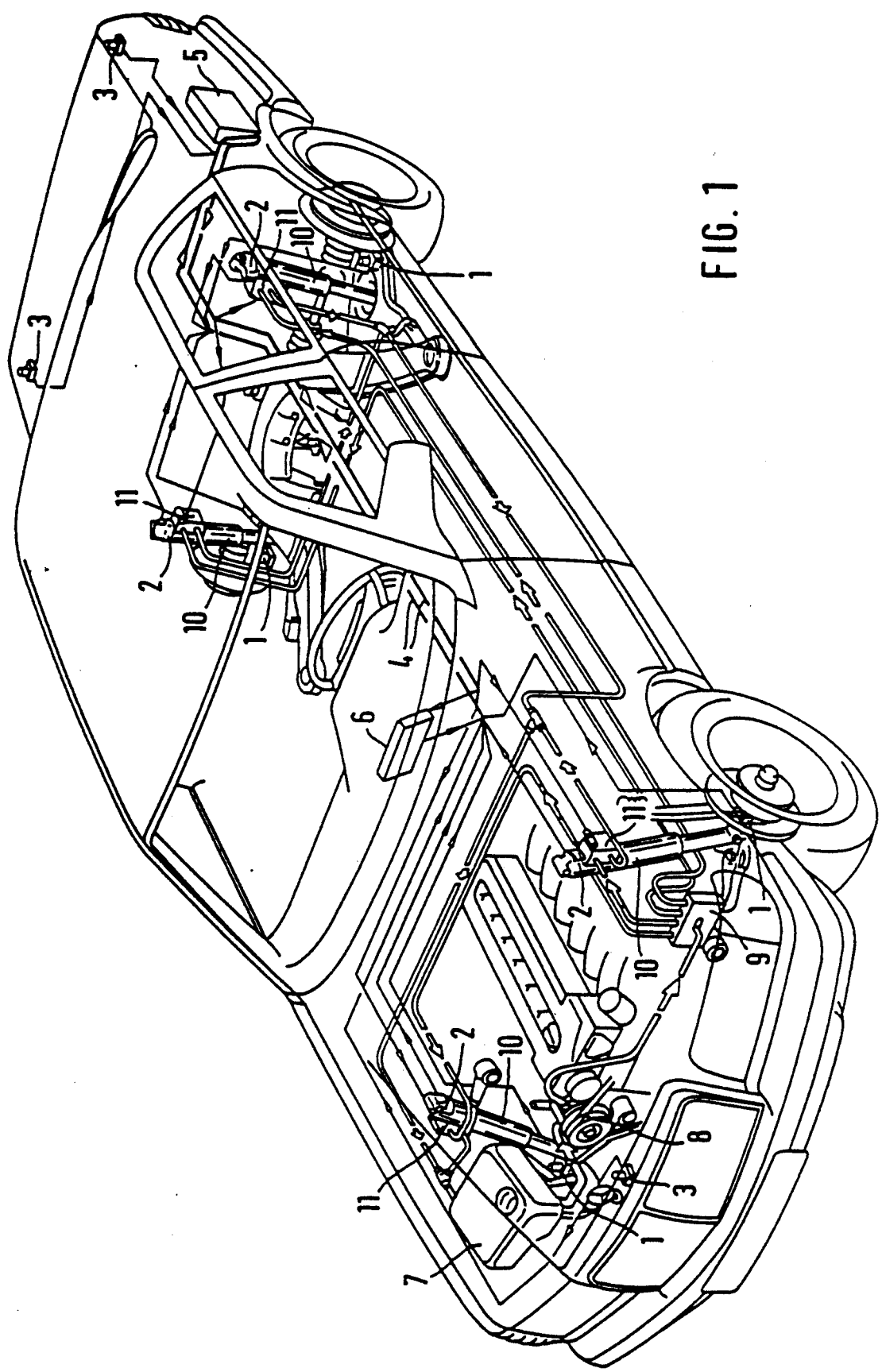
FIG. 1 shows a diagrammatic representation of a passenger car with a suspension system constructed according to a preferred embodiment of the invention.

The wheels of the vehicle are supported with respect to the vehicle body by means of hydraulic spring and support assemblies 10, which are designed as piston-/cylinder assemblies. A pump 8, which is driven by the vehicle engine, is connected on the suction side to a reservoir 7 for hydraulic oil and is connected on the pressure side to a distributor 9, from which pressure lines lead to the spring and support assemblies 10, which are furthermore connected via relief lines to the reservoir 7, serves as hydraulic pressure source. The feed of hydraulic medium into the spring and support assemblies and the discharge of hydraulic medium out of these assemblies is controlled via valve arrangements 11 which are arranged in each case on the spring and support assemblies 10 and are operated for their part by means of a computer or microprocessor 5, which is connected on the input side to deflection pick-ups 2 assigned to the wheels of the vehicle. The deflection pick-ups 2 generate signals which represent the respective lifting position of the wheels relative to the vehicle body. Furthermore, the computer or microprocessor 5 may be connected on the input side to wheel acceleration pick-ups 1 and/or body acceleration pick-ups 3. In addition, a manually operable command pick-up 6 may also be provided, in order to enable the driver to intervene in the control of the suspension system. The control commands of the computer or microprocessor 5 for the valve arrangements 11 or the signals of the pick-ups 1 to 3 to be fed to the computer or microprocessor 5, are passed on via a data network, which has at least in part data bus lines 4.

Figure 2:
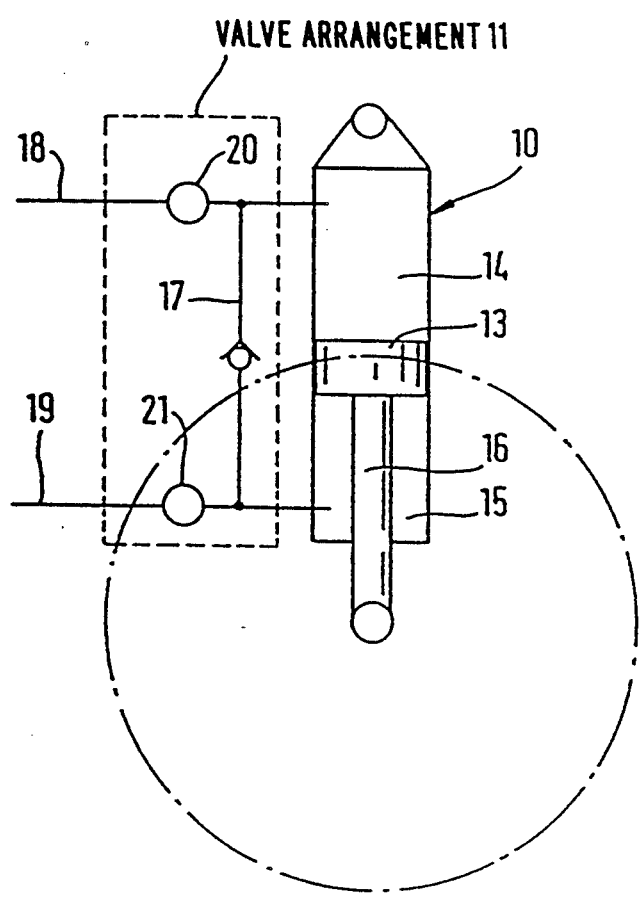
FIG. 2 shows a sectional diagram of a spring and support assembly of the suspension system of FIG. 1.

The support assemblies 10 and the valve arrangements 11 are represented somewhat more structurally in FIG. 2.

Each wheel 12 may be assigned a support assembly 10 which is designed as a piston/cylinder assembly and in each case has a chamber 14, arranged above the piston 13, and a chamber 15, arranged below the piston 13. The pressure in the chamber 14 acts to push the piston 13 downwards in FIG. 2, while the pressure in the chamber 15 acts in the opposite direction. When there is pressure equality in the chambers 14 and 15, the piston 13 is forced downwards, because the endface of the piston 13 impinged by the pressure in the chamber 15 is smaller, due to the piston rod 16, than the endface of the piston 13 impinged by the pressure in the chamber 14. The chambers 14 and 15 are connected to each other via a line 17, in which, as appropriate, a non-return valve opening in the direction of the chamber 15 when there is flow may be arranged. Connected to the line 17 is a pressure line 18, connected to the pressure side of the pump 8 or to the distributor 9 (see FIG. 1) (to be precise between the non-return valve, if any, arranged in the line 17 and the chamber 14). In addition, there branches off from the line 17 (to be precise between the non-return valve, if any, arranged therein and the chamber 15) a relief line 19. The feed of pressure medium via the pressure line 18 and the discharge of pressure medium via the relief line 19 are controlled by valves 20 and 21 of the valve arrangement 11. These valves are preferably designed as throttle valves with infinitely variably controllable throttling resistance.

By corresponding control of the valves 20 and 21, the pressure in the chambers 14 and 15 can be varied within structurally predetermined limits. In this context, it must be noted that high values of the pressure in the chambers 14 and 15 can be set in particular whenever the respective wheel 12 tries to compress, by brief closing of the valves 20 and 21 or by closing of the valve 20 and strong throttling of the valve 21. The system represented operates in the following way:

The signals of the deflection pick-ups 2 are a measure of the distance of the wheels, or of the wheel axles, from the vehicle body and accordingly also a measure of the distance of the vehicle body from the ground in the region of the respective wheel. The computer or microprocessor 5 can then determine an average ground clearance from the signals of the deflection pick-ups 2, for example by the mean value of the ground clearances measured by the deflection pick-ups 2 at the four wheels of the vehicle being formed. Variations of the average ground clearance thus indicate the vehicle is executing a lifting movement in one direction or the other relative to the ground.

Furthermore, an average pitch angle can be determined from the signals of the deflection pick-ups 2, for example, by the mean value of the ground clearances at the front wheels and the mean value of the ground clearances at the rear wheels firstly being determined and then the difference of these mean values being determined. Variations over time of this difference then indicate that the vehicle body is executing pitching oscillations, i.e. rotary movements about the vehicle transverse axis in one direction or the other, relative to the ground.

Furthermore, a mean value of the roll angle can be determined from the signals of the deflection pick-ups 2. For this purpose, the mean value of the ground clearances of the vehicle body at the wheels of the right side and the mean value of the ground clearances at the wheels of the left vehicle side are formed and then the difference of these mean values is determined. Variations over time of this difference indicate that the vehicle is executing rolling movements, i.e. rotations about the vehicle longitudinal axis in one direction or the other.

Pitch and roll angles determined in this way simultaneously have the value zero if the vehicle body is aligned approximately parallel to a plane which is for its part parallel to a straight line joining the wheel contact points of the right front wheel and of the left rear wheel as well as parallel to a straight line joining the wheel contact points of the left front wheel and the right rear wheel.

According to the invention, it is then envisaged that the computer or microprocessor 5 in each case registers the average ground clearance, the average roll angle and the average pitch angle, or the variation over time of these values. This is equivalent to saying that the computer or microprocessor breaks up each movement of the vehicle body relative to the ground into a lifting movement, a rolling movement and a pitching movement. Consequently, the possibility is created of countercontrolling the different types of movement of the vehicle body in a different way, i.e. in particular with different progressivity.

For example, there is the possibility of achieving a soft suspension behavior with respect to lifting movements, while the suspension behavior is set distinctly harder, i.e. with higher spring rigidity, with respect to pitching and rolling movements. Thus, if deviations between the actual value of the average ground clearance and the respective set value occur, the supporting forces of the support assemblies 10 can be slightly changed relatively, at least within a mid-range of the suspension strokes, in order to attain a particularly comfortable suspension. If there are deviations between the mean values of roll angle or pitch angle and the respective set values, on the other hand, greater changes in the supporting forces of the support assemblies 10 may be made in order to ensure safe vehicle handling, in particular at higher speeds.

Thus, according to the invention, the supporting force of a support assembly is not determined primarily as a function of the respective lifting position of the wheel, rather what is decisive for the dimensioning of the supporting forces is the extent to which the vehicle body has to execute a pure lifting movement relative to the ground and/or a rotation about the vehicle longitudinal axis (change of the roll angle) and/or a rotation about the vehicle transverse axis (change of the pitch angle) to achieve a desired set position.

In this case, the changes or corrections of the supporting forces of the support assemblies 10, calculated separately for correction of the respective lifting position and for correction of the respective roll angle and for correction of the respective pitch angle can be simply combined with one another additively, i e. the change of the supporting force actually made at each support assembly corresponds in each case to the sum of the individual corrections which were calculated for the desired change of the lifting position or of the roll angle or of the pitch angle.

In extreme cases, the overall correction calculated may be outside the structural possibilities of the support assemblies. In such a case, the structurally achievable limit value takes effect at the respective support assembly 10.

Due to the acceleration pick-ups 1 and 3, in particular due to the wheel acceleration pick-ups 1, the computer or microprocessor can detect certain driving conditions at a particularly early time. For example, if there is a sudden strong turning of the steering, a marked transverse acceleration of the wheels or of the vehicle body occurs before the vehicle body tries to incline towards the respective outside of the bend, i.e. before the respective driving condition leads to a roll angle which can be registered by the deflection pick-ups 2. A similar situation applies in the case of strong decelerations or accelerations of the vehicle. Here too, the vehicle body only reacts after a certain delay time with pitching movements, which can be detected by the deflection pick-ups 2. By arrangement of the acceleration pick-ups 1 and 3, the possibility is therefore created that the computer or microprocessor 5 is already "prepared" at an early time for rolling or pitching movements of the vehicle body to be expected and already actuates the support assemblies 10 for the generation of corresponding counterforces before the pitching and/or rolling movements actually occur. Pitching and/or rolling movements are consequently avoided virtually completely.

In principle, there is the possibility that a front wheel and the diagonally opposite rear wheel compress simultaneously, while the other front wheel and the diagonally opposite other rear wheel rebound simultaneously. If the compression strokes and the rebound strokes are all equally large, the mean values of the ground clearance, of the roll angle and of the pitch angle do not change. Nevertheless, such wheel movements are undesired, because they may result in the ground grip of the wheels being lost. Therefore, it is envisaged always to counteract the lifting movements of the wheels, in particular during compression, with a certain damping resistance, which may be generated for example by corresponding throttling during the compression stroke of the valve 21 (see FIG. 2) (as a rule, the valve 20 is closed during the compression stroke). Moreover, there is the possibility that the computer or microprocessor 5 determines from the signals of the deflection pick-ups 2 whether, or to what extent, wheel movements of the type just indicated occur. Then the support assemblies 10, or their valve arrangements 11, can be actuated in the sense of a more or less strong damping of these wheel movements.

In FIG. 3, the invention is represented like a circuit diagram, corresponding elements having the same reference numerals as in FIGS. 1 and 2. In this case, fluid lines are represented by solid lines and electric lines by dot-dashed lines. Dotted lines show that the deflection pick-ups 2 represent signals dependent on the position of the support assemblies 10 and thus on the distance between the vehicle wheels and the vehicle body.

For reasons of clarity, in FIG. 3 only a single support assembly 10, with associated valve arrangement 11 and assigned deflection pick-up 2, is represented; in actual fact, a plurality of these elements, corresponding to the number of wheels of the vehicle, are arranged in each case.

Unlike the representation in FIG. 1, in FIG. 3 each support assembly 10 is assigned a force or pressure pick-up 22, the signal of which represents the supporting force applied in each case by the support assembly 10. For this purpose, the force or pressure pick-up may be designed in the manner of a pressure gauge which reacts to the fluid pressure in the support assembly 10. Instead, it is also contemplated that the force or pressure pick-up 22 reacts in each case to the forces acting between support assembly 10 and vehicle body.

By means of the force or pressure pick-up 22, the computer 5 can control the valve arrangements 11 even better to match the respective driving conditions, i.e. as well as a control as a function of the signals of the deflection pick-ups 2 and of the body acceleration pick-ups 3, if any, a control as a function of the supporting forces which are generated in each case by the support assemblies 10 is also possible.

This is of advantage in particular whenever the steering behavior of the vehicle is also to be influenced in a particular way by the suspension system.

According to the invention, it is envisaged to have the forces serving to suppress or damp rolling movements of the vehicle body applied in predeterminable proportions by the spring or support assemblies 10 of the front and rear wheels of the vehicle in order to achieve a desired control tendency, a more or less strong tendency towards under-controlling generally being desirable with a view to vehicle handling which can be controlled well even by unskilled drivers.

In principle, a corresponding control is also possible as a function of the signals of the deflection pick-ups 2 alone, by the spring or support assemblies 10 of the front and rear wheels being actuated differently in a predetermined way for the suppression or damping of rolling movements which can be established by evaluation of the deflection pick-up signals.

If there are force or pressure pick-ups 22, this different actuation of the spring or support assemblies 10 at the front and rear wheels of the vehicle may be performed particularly sensitively, because signals which directly represent the distribution of the supporting forces over the various spring and support assemblies are available.

According to a particularly preferred embodiment of the invention, it is envisaged to regulate the control tendency of the vehicle as a function of the lateral acceleration of the vehicle. In this case, there is, for example, the possibility of achieving a situation where the tendency towards under-controlling increases progressively with increasing lateral acceleration, the under-controlling tendency increasing, as appropriate, relative to the lateral acceleration, according to a parabolic curve.

For the regulation, there may be controlled in the computer for each value of the lateral acceleration correspondingly different set values for the distribution of the supporting forces on the front and rear wheels counteracting the rolling movements, so that the computer can compare the actual value of the distribution of the supporting forces on the front and rear wheels, which can be determined, for example, by means of the force or pressure pick-ups 22, with the respective set value and can countercontrol a deviation between actual value and set value by corresponding control of the valve arrangements 11 assigned to the respective spring or support assemblies.

In this case it may be provided that the regulation is not carried out until the lateral acceleration of the vehicle exceeds a predeterminable threshold value.

In that case, an abrupt changing of the control tendency of the vehicle when the threshold value of the lateral acceleration is exceeded can be avoided, if appropriate, by the computer 5 using the respectively determined actual value as set value for the distribution of the supporting forces over the spring or support assemblies 10 of the front and rear wheels when the threshold value of the lateral acceleration is reached and, starting from this value, calculating progressively increasing set values, in the sense of a progressive increase in the desired control tendency, with increasing acceleration, and actuating them by operation of the valve arrangements 11.

Thus, for example, according to the invention an increasing tendency toward undercontrolling with increasing lateral acceleration of the vehicle can be achieved. This is of advantage because, even before reaching a critical limit range of the lateral acceleration, due to the increasing tendency of the vehicle toward undercontrolling, the driver is given a good feeling that the driving situation could become critical. This leads to the driver intuitively slowing the speed of the vehicle and thus increasing the safety of the driving situation.

It is understood by tendency towards undercontrolling of the vehicle that, at excessive cornering speed, the vehicle initially tries to break out via the front wheels. The advantage of this control behavior is that, on reaching or even exceeding the limit range of road grip, a reduction in the speed is sufficient to make the vehicle controllable again. In particular, no steering maneuvers which are difficult for unpractised drivers have to be carried out.

The lateral acceleration of the vehicle can be determined by means of the body acceleration pick-ups 3.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. An active suspension system for a motor vehicle comprising
   a computer,
   actual-value pick-ups assigned to wheels of the vehicle, each of the pick-ups operatively arranged to generate a signal representative of the distance between the vehicle body and the respective wheel and feed the signal to the computer,
   spring and support assemblies assigned to the wheels and operatively arranged to provide supporting forces and/or resistances counteracting the lifting movements of the wheels controlled by the computer, wherein the computer is operatively arranged to determine from the signals of the actual-value pick-ups an actual value of the averaged ground clearance, an actual value of the averaged roll angle and an actual value of the averaged pitch angle of the vehicle body and to actuate the spring and support assemblies as a function of the deviations of the actual values from set values, such that the total correction of the supporting forces and/or resistances effected by the computer has a value which corresponds essentially to the sum of those values which the computer would effect for the correction of the averages ground clearance alone and for the correction of the pitch angle alone and for the correction of the roll angle alone, and the computer is operatively arranged to actuate the supporting forces and/or resistances such that forces of the spring and support assemblies affecting rolling movements of the vehicle body can be applied by the spring and support assemblies of the front and rear wheels at predeterminable proportions to achieve a steerage tendency of the vehicle including understeering, oversteering and a neutral behavior.

2. The active suspension system according to claim 1, wherein the computer determines from each of the pick-up signals the variation over time of the actual values of the averaged ground clearance, of the averaged roll angle and of the averaged pitch angle and actuates the spring and support assemblies also as a function of the rate of change of said actual value.

3. The active suspension system according to claim 1, wherein one of the mean value of the distances of all wheels with respect to the vehicle and a value correlated with the mean value of the distances is used as the averaged ground clearance.

4. The active suspension system according to claim 1, wherein one of the difference between the means value of the distances of the front wheels from the vehicle body and the mean value of the distances of the rear wheels from the vehicle body and a value correlated with the difference are used as the averaged pitch angle.

5. The active suspension system according to claim 2, wherein one of the difference between the mean value of the distances of the front wheels from the vehicle body and the mean value of the distances of the rear wheels from the vehicle body and a value correlated with the difference are used as the averaged pitch angle.

6. The active suspension system according to claim 1, wherein one of the difference between the mean value of the distances of the right wheels from the vehicle body and the mean value of the distances of the left wheels from the vehicle body and a value correlated with the difference are used as the averaged roll angle.

7. The active suspension system according to claim 2, wherein one of the difference between the mean value of the distances of the right wheels from the vehicle body and the mean value of the distances of the left wheels from the vehicle body and a value correlated with the difference are used as the averaged roll angle.

8. The active suspension system according to claim 3, wherein one of the difference between the mean value of the distances of the right wheels from the vehicle body and the mean value of the distances of the left wheels from the vehicle body and a value correlated with the difference are used as the averaged roll angle.

9. The active suspension system according to claim 4, wherein one of the difference between the mean value of the distances of the right wheels from the vehicle body and the mean value of the distances of the left wheels from the vehicle body and a value correlated with the last-mentioned difference are used as the averaged roll angle.

10. The active suspension system according to claim 1, wherein the computer is operatively arranged to determine from the pick-up signals such wheel positions or such wheel movements which are without influence on the mean values of the ground clearance, the roll angle and/or the pitch angle and to actuate the spring and support assemblies for damping, the value of which damping depends on the movements or positions of the wheels.

11. The active suspension system according to claim 3, wherein the computer is operatively arranged to determine from the pick-up signals such wheel positions or such wheel movements which are without influence on the mean values of the ground clearance, the roll angle and/or the pitch angle and to actuate the spring and support assemblies for damping, the value of which damping depends on the movements or positions of the wheels.

12. The active suspension system according to claim 1, wherein means for detecting acceleration of the vehicle in at least one of a vertical direction, a longitudinal direction and a transverse direction are operatively arranged in the vehicle such that signals of the detecting means provide an additional stabilization of the vehicle with respect to lifting, pitching and/or rolling movements.

13. The active suspension system according to claim 1, wherein means is provided for varying distribution of the proportions of the forces of the spring and support assemblies affecting rolling movements of the vehicle body over the front and rear wheels of the vehicle as a function of lateral acceleration of the vehicle.

14. The active suspension system according to claim 13, wherein the distribution is variable so as to effect an increasing tendency towards under-controlling with increasing lateral acceleration of the vehicle.

15. The active suspension system according to claim 13, wherein means is provided for regulating the distribution of the proportions of the forces of the spring and support assemblies affecting rolling movements of the vehicle body over the front and rear wheels or a desired control tendency of the vehicle towards under-controlling.

16. The active suspension system according to claim 14, wherein means is provided for regulating the distribution of the proportions of the forces of the spring and support assemblies affecting rolling movements of the vehicle body over the front and rear wheels or a desired control tendency of the vehicle towards under-controlling.

17. The active suspension system according to claim 20, wherein means is provided for regulating the distribution of the proportions of the forces of the spring and support assemblies affecting rolling movements of the vehicle body over the front and rear wheels or a desired control tendency of the vehicle towards under-controlling.

18. The active suspension system according to claim 15, wherein the means for regulation only commences operation at a minimum value of the lateral acceleration, and the computer is operatively arranged to predetermine set values for the distribution or control tendency, which set values are dependent on the lateral acceleration and increase progressively with increasing lateral acceleration such that the set value assigned to the minimum value of the lateral acceleration coincides with the actual value determined a last time the minimum value occurred.

19. The active suspension system according to claim 18, wherein the distribution is variable so as to effect an increasing tendency towards under-controlling with increasing lateral acceleration of the vehicle.

* * * * *